United States Patent [19]

Matsuo et al.

[11] 4,302,371
[45] Nov. 24, 1981

[54] STABILIZED ROSIN ESTER AND PRESSURE-SENSITIVE ADHESIVE AND HOT-MELT COMPOSITION BASED THEREON

[75] Inventors: Kohtaro Matsuo, Mino; Seiichi Tsuchida, Sakai, both of Japan

[73] Assignee: Arakawa Kagaku Kogyo Kabushiki Kaisha, Osaka, Japan

[21] Appl. No.: 169,619

[22] Filed: Jul. 17, 1980

Related U.S. Application Data

[63] Continuation of Ser. No. 47,125, Jun. 11, 1979, Pat. No. 4,248,770.

[30] Foreign Application Priority Data

Jun. 23, 1978 [JP] Japan ................................. 53/76725

[51] Int. Cl.$^3$ .......................... C09F 1/04; C08L 91/06; C08L 93/04
[52] U.S. Cl. .............................. 260/28.5 R; 260/27 R; 260/27 BB; 260/28.5 A; 260/28.5 AV; 260/28.5 B; 260/28.5 D; 260/104; 260/106
[58] Field of Search ................. 260/27 R, 27 BB, 104, 260/106, 28.5 R

[56] References Cited

U.S. PATENT DOCUMENTS

| 2,130,997 | 9/1938 | Littmann | 260/103 |
| 2,154,629 | 4/1939 | Littmann | 260/103 |
| 2,331,803 | 10/1943 | Schlaanstine | 260/104 |
| 2,369,125 | 2/1945 | Anderson | 260/104 |
| 2,407,248 | 9/1946 | Borglin | 260/104 |
| 2,492,145 | 12/1949 | Hampton | 260/106 |
| 3,632,540 | 1/1972 | Unmuth et al. | 260/27 R |

Primary Examiner—H. S. Cockeram
Attorney, Agent, or Firm—Armstrong, Nikaido, Marmelstein & Kubovcik

[57] ABSTRACT

A process for preparing a stabilized rosin ester having a higher softening point which comprises subjecting a rosin to disproportionation and purification, and esterifying the resulting purified disproportionated rosin with a tri- or more valent polyhydric alcohol to give a rosin ester having a softening point (according to ring and ball method) of 65° to 140° C. The resulting rosin ester has superior heat resistance and aging resistance as well as a high softening point and is suitably employed as a tackifier for pressure-sensitive adhesive compositions and hot-melt compositions.

10 Claims, No Drawings

STABILIZED ROSIN ESTER AND PRESSURE-SENSITIVE ADHESIVE AND HOT-MELT COMPOSITION BASED THEREON

This is a continuation of application Ser. No. 047,125, filed June 11, 1979, now U.S. Pat. No. 4,248,770.

BACKGROUND OF THE INVENTION

The present invention relates to a process for preparing a stabilized rosin ester having a higher softening point, and a pressure-sensitive adhesive composition and hot-melt composition containing the stabilized rosin ester as a tackifier.

Heretofore, rosin esters have been used as tackifiers for pressure-sensitive adhesives and hot-melt adhesives, or modifiers for rubbers. Rosin esters have also been incorporated into a variety of plastics to improve their properties such as adhesiveness, rigidity, processability and heat sealability. Common rosin esters have a low softening point and are poor in heat resistance and aging resistance. As rosen esters improved in such properties, disproportionated rosin esters and hydrogenated rosin esters are commercially available. However, these rosin esters also do not have a sufficiently high softening point and superior heat resistance and aging resistance. Therefore there is a great demand for a highly stabilized rosin esters having a higher softening point, particularly suitable for use in pressure-sensitive adhesives and hot-melt adhesives.

OBJECTS OF THE INVENTION

It is an object of the present invention to provide a process for preparing a highly stabilized rosin ester having a higher softening point.

A further object of the invention is to provide a pressure-sensitive adhesive composition having improved adhering properties.

Another object of the invention is to provide a hot melt composition improved adhering properties.

These and other objects of the invention will become apparent from the description hereinafter.

DETAILED DESCRIPTION

It has now been found that the above-mentioned objects can be attained by a process for preparing a stabilized rosin ester having a higher softening point which comprises subjecting a rosin to disproportionation and purification, and esterifying the resultant with a tri- or more valent polyhydric alcohol to give a rosin ester having a softening point (according to ring and ball method) of 65° to 140° C.

In the instant sepcification, the term "higher softening point" is intended to mean that the softening point of the stabilized rosin ester prepared according to the present invention is relatively higher than that of a conventional rosin ester in case that both rosin esters are prepared by esterification with the same polyhydric alcohol.

Generally rosins used as a starting material in preparing rosin esters contain high molecular materials presumably resulting from their peroxides and unsaponifiable materials. Presuming that such materials have a detrimental influence on the properties of the obtained rosin esters as a final product, the present inventors had tried to prepare a rosin ester by purifying a rosin as a starting material to remove the high molecular materials and unsaponifiable materials mentioned above and esterifying the purified rosin with a polyhydric alcohol. However, the properties of the rosin ester thus obtained were not sufficiently improved. As a result of the present inventor's further researches, it has been found out that a highly stabilized rosin ester having a higher softening point can be obtained by at first disproportionating a rosin as a starting material, then purifying the disproportionated rosin to remove high molecular materials and unsaponifiable materials, and finally esterifying the purified disproportionated rosin with a polyhydric alcohol.

The stabilized rosin ester prepared by the process of the present invention has a softening point of 65° to 140° C., preferably 90° to 140° C., preferably 90° to 140° C. and preferably has an acid value of not more than 30, more preferably not more than 20 and a weight average molecular weight of 700 to 1,100.

The stabilized rosin ester prepared by the instant process has excellent stabilities such as heat resistance and aging resistance, and has a higher softening point in spite of its small molecular weight. When the stabilized rosin ester prepared by the instant process is used as a tackifier for pressure-sensitive adhesives and hot-melt adhesives utilizing its excellent stability and higher softening point, marked effects can be exhibited.

A rosin ester having such excellent properties as mentioned above can be obtained by the process of the present invention in which a rosin is disproportionated, the disproportionated rosin is purified to remove substantially impurities such as high molecular materials and unsaponifiable materials, and the purified disproportionated rosin is esterified with a polyhydric alcohol. The unexpected results of the instant process will be apparent from the results of the following experience: Employing a purified disproportionated rosin obtained by purifying a disproportionated rosin and an unpurified disproportionated rosin which is a disproportionated rosin without purification as a starting material, respectively, each disproportionated rosin was esterified with glycerol under the same condition to give two kinds of rosin glycerol esters. The properties of the rosin glycerol esters are shown in Table 1.

TABLE 1

| | Rosin glycerol ester | | | Pressure-sensitive adhesive | | |
|---|---|---|---|---|---|---|
| Starting material | Softening point (°C.) | Weight average molecular weight | Acid value | Tackiness (cm.) | Cohesive strength (mm.) | Peel strength (g./25 mm.) |
| Purified disproportionated rosin | 97 | 766 | 7 | 1.5 | 1.4 | 1,040 |
| Unpurified disproportionated rosin | 81 | 895 | 7 | 1.7 | 2.0 | 690 |

Note:
With respect to tackiness and cohesive strength, the samller value shows the higher tackiness or cohesive strength. With respect to peel strength, the larger value shows the higher peel strength.

As is clear from Table 1, the rosin glycerol ester obtained from the purified disproportionated rosin according to the instant process has a higher softening point by 16° C. than the rosin glycerol ester obtained from the unpurified disproportionated rosin has, although the former has a smaller weight average molecular weight by 129 than the latter has.

Each rosin glycerol ester obtained above was blended with a natural rubber so that the weight ratio of the rosin glycerol ester to the natural rubber was 45:55 to give two kinds of pressure-sensitive adhesives. The properties of the obtained pressure-sensitive adhesives are also known in Table 1. As is clear from the table 1, the pressure-sensitive adhesive employing the rosin glycerol ester obtained from the purified disproportionated rosin according to the instant process has a higher peel strength by about 50% than the pressure-sensitive adhesive employing the rosin glycerol ester obtained from the unpurified disproportionated rosin has. With respect to the tackiness, both pressure-sensitive adhesives have excellent tackinesses between which there is no substantial difference.

It is a surprising fact that a pressure-sensitive adhesive or hot-melt adhesive employing as a tackifier the rosin glycerol ester obtained according to the instant process has a high tackiness and a high adhesive strength, although the rosin glycerol ester has a higher softening point. In case of chemically similar tackifiers, it is a common knowledge in the art that a tackifier having a higher softening point give a higher adhesive strength but a lower tackiness.

Furthermore, the rosin ester prepared by the process of the present invention is highly stabilized, that is, it has excellent heat resistance and aging resistance. Therefore, a pressure-sensitive adhesive or hot-melt adhesive employing the rosin ester as a tackifier maintains the above-mentioned excellent adhesiveness and tackiness for a long period.

The process of the present invention will be explained in more details.

In the process of the present invention, at first a rosin is disproportionated in a conventional manner to give a disproportionated rosin. For instance, the disproportionation is carried out by heating a rosin at 100° to 300° C., preferably 150° to 290° C. for 10 minutes to 8 hours in the presence of a disproportionating catalyst. Examples of the disproportionating catalyst are supported or non-supported metals such as palladium, nickel and platinum, iodine, iodides such as iron iodide, sulfur dioxide and sulfides such as iron sulfide. Among those catalysts, the metals and the iodides are preferably employed since a disproportionated rosin having a high softening point can be readily obtained. The catalyst is employed in an amount of 0.01 to 5% by weight, preferably 0.1 to 1% by weight on the basis of the amount of a rosin employed. Examples of the rosin employed as a starting material are gum rosin, wood rosin and tall oil rosin. The disproportionated rosin prepared in the above manner has preferably a content of abietic acid of not more than 5% by weight, particularly not more than 1% by weight.

The unpurified disproportionated rosin obtained in the preceding step is then subjected to purification. In the present invention, the term "purification" is intended to mean removing impurities contained in the unpurified disproportionated rosin, particularly high molecular materials which are presumed to be formed from peroxides contained in the rosin employed as a starting material, unsaponified materials which are originally contained in the rosin, and unsaponifiable materials which are formed in the disproportionation reaction.

The purification can be carried out according to usual purification methods such as distillation under reduced pressure, crystallization and extraction.

The distillation is carried out under usual conditions. Usually a pressure of not more than 30 mmHg, preferably 2 to 20 mmHg, and a temperature of liquid bottom of 200° to 300° C., preferably 230° to 290° C. are employed. For instance, a main fraction distilled under a pressure of 3 mmHg at a temperature of liquid bottom of 210° to 300° C. is collected as a desired fraction. When the reduced pressure is 3 mmHg, a lower boiling fraction distilled at a temperature of liquid bottom of less than 210° C. is not suitable since it contains unsaponifiable materials and a higher boiling fraction distilled at a temperature of liquid bottom of more than 300° C. is not suitable since it is colored markedly. Under usual distillation conditions, the amount of the desired fraction is 60 to 92% by weight, particularly 75 to 90% by weight based on the amount of the unpurified disproportionated rosin employed. The desired fraction has preferably an acid value of not less than 170, particularly not less than 177 and a softening point of 75° to 90° C. The amount of the lower boiling fraction and the amount of the distillation residue are 3 to 20% by weight, particularly 5 to 10% by weight and 5 to 30% by weight, particularly 5 to 15% by weight, respectively, based on the amount of the unpurified disproportionated rosin employed.

The crystallization is also carried out according to usual methods. For instance, it is carried out by preparing a solution of the disproportionated rosin in a solvent by heating and subsequently cooling it. Alternatively, the crystallization may be carried out by preparing a solution of the disproportionated rosin in a good solvent and then adding a poor solvent thereto. Examples of the good solvent are benzene, toluene, xylene, chloroform, lower alcohols such as methanol, ketones such as acetone, lower alkyl acetates such as ethyl acetate and mixtures of two or more forgoing solvents. Examples of the poor solvent are n-hexane, n-heptane, cyclohexane, isooctane and mixtures of two or more forgoing solvents. As the solvent employed in the former method, one or more good solvents or mixed solvents of one or more good solvents and one or more poor solvents are employed. The crystallized disproportionated rosin has preferably an acid value of not less than 170, particularly not less than 177.

The extraction method usually consists of preparing an aqueous solution of an alkali metal salt of the disproportionated rosin by employing an alkali metal hydroxide such as sodium hydroxide or potassium hydroxide, extracting insoluble materials such as unsaponifiable materials with a water-immiscible organic solvent, and acidifying the resulting aqueous layer with an acid such as hydrochloric acid or sulfuric acid to form a precipitate. Examples of the solvent are benzene, toluene, xylene and ethers such as diethyl ether. The obtained precipitate has preferably an acid value of not less than 170, particularly not less than 177.

Among the above purification methods, the distillation method is most preferable from an economical point of view.

In the process of the present invention, a purified disproportionated rosin is prepared by purifying a disproportionated rosin. It is not preferable to prepare a purified disproportionated rosin by disproportionating a purified rosin since unsaponifiable materials are formed in the disproportionation reaction and the unsaponifiable materials are determined to the properties of a rosin ester as final product.

The purified disproportionated rosin is then esterified with a tri- or more valent polyhydric alcohol to give a rosin ester as final product. The esterification can be carried out according to usual methods. For instance, it is carried out by heating the purified disproportionated rosin and a tri- or more valent polyhydric alcohol in a closed or open reaction vessel in the presence of or in the absence of an esterifying catalyst and in the presence of or in the absence of a solvent at 180° to 300° C., preferably 200° to 290° C. for 1 to 20 hours, preferably 5 to 15 hours. Examples of the esterifying catalyst employed if desired are acidic catalysts such as sulfuric acid, acetic acid and p-toluenesulfonic acid, alkaline earth metal hydroxides such as calcium hydroxide, metal oxides such as magnesium oxide and calcium oxide, carbonates such as calcium carbonate and acetates such as magnesium acetate and calcium acetate. Examples of the solvent employed if desired are aromatic solvents such as benzene, toluene and xylene.

Examples of the tri- or more valent polyhydric alcohol employed are glycerol, trimethylolethane, trimethylolpropane, pentaerythritol, diglycerol, dipentaerythritol, mannitol, sorbitol and hexitol. Among them, glycerol and pentaerythritol are preferable. Those polyhydric alcohols may be employed alone or in combination.

In the process of the present invention, a glycol may be employed in combination with the tri- or more valent polyhydric alcohol in such an amount that the properties of the obtained rosin are not influenced significantly. Examples of the glycol are ethylene glycol, diethylene glycol, triethylene glycol and neopentyl glycol. These glycols may be employed alone or in combination. The glycol is preferably employed in such an amount that the following relationship is satisfied:

$$\frac{A}{A+B} > 0.5$$

wherein A is the hydroxyl equivalents of a tri- or more valent polyhydric alcohol employed and B is the hydroxyl equivalents of a glycol employed.

The tri- or more valent polyhydric alcohol is preferably employed in such an amount that the following relationship is satisfied:

$$\frac{X}{Y} = 1.0 \text{ to } 1.5$$

wherein X is the hydroxyl equivalents of a tri- or more polyhydric alcohol employed or the total hydroxyl equivalents of a mixture of a tri- or more valent polyhydric alcohol and a glycol if employed, and Y is the carboxyl equivalents of the purified disproportionated rosin employed.

The rosin ester obtained by esterifying the purified disproportionated rosin with a tri- or more valent polyhydric alcohol in the manner described above has a softening point of 65° to 140° C., preferably 90° to 140° C. and preferably has an acid value of not more than 30, more preferably not more than 20 and a weight average molecular weight of 700 to 1,100.

The stabilized rosin ester prepared by the process of the present invention is light-colored and has superior heat resistance and aging resistance. The stabilized rosin ester is quite suitable as a tackifier for pressure-sensitive adhesives and hot-melt adhesives, utilizing those superior properties. When the stabilized rosin ester is employed as a tackifier particularly for pressure-sensitive adhesives, marked effects such as superior adhesiveness and tackiness can be exhibited.

The present invention further provides a pressure-sensitive adhesive composition comprising an elastomer and the stabilized rosin ester obtained above as a tackifier. The pressure-sensitive adhesive composition of the present invention has superior adhesiveness and tackiness, and retains the superior properties for a long period due to the superior heat resistance and aging resistance. Examples of the elastomer employed in the present invention include natural rubbers, synthetic rubbers such as randam copolymer of styrene and butadiene, block copolymer of styrene and butadinene, block copolymer having a block structure of polystyrene-polyisoprene-polystyrene, block copolymer having a block structure of polystyrene-polyethylene-polybutyrene-polystyrene, nitrile rubber, chloroprene rubber, polybutaidene, isoprene-isobutylene rubber and polyvinyl ether, and acrylic elastomers such as homopolymer of acrylates such as methyl acrylate, butyl acrylate and 2-ethylhexyl acrylate, copolymer of the foregoing acrylates, and copolymer of the foregoing acrylates and other monomers such as acrylic acid and methacrylic acid. These elastomers may be employed alone or in combination. The stabilized rosin ester is usually employed in an amount of 20 to 150 parts by weight per 100 parts by weight of the elastomer.

The pressure-sensitive adhesive composition of the present invention may contain further other components including tackifiers other than the stabilized rosin ester such as rosin and its derivatives, and terpene resin, plasticizers such as dioctyl phthalate and dibutyl phthalate, and fillers such as zinc oxide, carbon black and titanium oxide.

The pressure-sensitive adhesive composition of the present invention is suitably employed for preparing a pressure-sensitive adhesive film. The pressure-sensitive adhesive film is usually prepared by mixing the composition by means of a mixing roll, melting it by heating, applying the molten composition on a backing and passing the resultant through calender rolls, or by preparing a solution of the composition in a solvent, applying the solution on a backing by means of a spreader or an applicator and drying the resultant by heating. As the backing, regenerated cellulose film, papers and plastic films such as polyester film are employed.

Furthermore, the present invention provides a hot-melt composition particularly suitable for adhesives comprising at least one of an ethylenic copolymer and wax, and the stabilized rosin ester obtained above as a tackifier.

The hot-melt composition of the present invention employing the stabilized rosin ester shows the following marked effects in comparison with a hot-melt composition employing a conventional rosin ester prepared by employing an unpurified disproportionated rosin (hereinafter referred to as "composition A") and a hot-melt composition employing a rosin ester prepared by employing a purified rosin (hereinafter referred to as "composition B"). The instant composition has a lower melt viscosity in molten state than the composition A has, although the stabilized rosin ester employed in the instant composition has a higher softening point than the rosin ester employed in the composition A has. Therefore, the instant composition gives a molten composition having a proper melt viscosity even if the heating temperature is low, so that the thermal decoposition of the composition can be depressed and the cost required for melting the composition can be reduced. The instant composition hardly gives a bad odor on heating in comparison with the composition A. Furthermore, the instant composition has a high adhesive strength at an elevated temperature as well as at an ambient temperature, while the composition A does not has a high adhesive strength at an elevated temperature. The composition b is discolored and decomposed on heating so that it is not suitable as a hot-melt composition. However, the instant composition is scarcely discolored and decomposed on heating so that it is suitable as a hot-melt composition.

The ethylenic copolymer employed in the present invention includes copolymers of ethylene and other various monomers. Representative examples are copolymers of ethylene and other monomers such as vinyl acetate, methyl acrylate, ethyl acrylate and other acrylates. Preferably examples of the wax employed in the present invention are mineral waxes such as paraffin wax and microcrystalline wax, and synthetic waxes such as polyethylene wax and polypropylene wax. Other animal or vegetable waxes can also be employed. Although the stabilized rosin ester employed in the present invention shows a good compatibility and gives a hot-melt composition having superior adhering properties when employed in admixture with at least one of the ethylenic copolymer and the wax, other polymers such as polyamide, polyester, polyvinyl acetal and polyurethane may be employed in combination with at least one of the ethylenic copolymer and the wax.

The hot-melt composition of the present invention if applicable to a wide variety of uses by varying the proportions of the stabilized rosin ester and at least one of the ethylenic copolymer and the wax. When it is desired to obtain a hot-melt composition for building materials for which especially high cohesive strength and excellent rigidity and flexibility are required, the ethylenic copolymer alone is employed in combination with the stabilized rosin ester to give a hot-melt composition having a high cohesive strength and excellent rigidity and flexibility. When it is desired to obtain a hot-melt composition for sealing agents for which a high cohesive strength or excellent flexibility are not especially required but an excellent snug-fit contact is required, the wax is employed in combination with the stabilized rosin ester to give a hot-melt composition having a low melt viscosity and excellent fitting properties. When the ethylenic copolymer and the wax are employed in a range of 10 to 300 parts by weight, preferably 20 to 150 parts by weight of the latter per 100 parts by weight of the former to combine the excellent cohesive strength, rigidity and flexibility of the ethylenic copolymer with the lower melt viscosity of the wax, a hot-melt composition having excellent adhering properties is obtained. When the wax is employed in a relatively small amount within the above range, the resulting composition is preferably employed as an adhesive, while the wax is employed in a relatively large amount within the above range to give a composition suitable as a coating agent.

The proportion of the stabilized rosin ester and at least one of the ethylenic copolymer and the wax varies depending upon the kinds and proportion of the ethylenic copolymer and wax employed, and the use of the resulting composition. Generally, the stabilized rosin ester is employed in an amount of 10 to 150 parts by weight per 100 parts by weight of at least one of the ethylenic copolymer and the wax.

The hot-melt composition of the present invention may contains other components including tackifiers other than the stabilized rosin ester such as rosin and its derivatives, and terpene resin, plasticizers such as tricresyl phosphate and dioctyl adipate, and fillers such as barium sulfate, calcium carbonate and titanium dioxide.

The hot-melt composition of the present invention is preferably in forms of rod, grains or pellets at an ambient temperature for ease of handling.

The hot-melt composition of the present invention shows excellent adhering properties to materials having a large porosity such as papers and woods as well as materials having a smooth surface such as plastics. Therefore, it is suitably applicable to a wide variety of fields, for instance, adhesion of papers or plastics films or sheets, bookbinding, production of footgears, production of laminates, production of plywoods for furniture industry, adhesion of papers to metals or plastics, adhesion of metals to plastics, coating of papers, fibers, plastic films or sheets, or metals, and uses for sealing agents.

When the hot-melt composition of the present invention is employed as an adhesive, the composition in molten state is applied on the surface of a first adherend usually in an amount of 5 to 50 g./m.$^2$ by a roll coater or an applicator and another adherend is pressed onto the first adherend while the composition is in molten state, followed by cooling for soldification. Alternatively, after the composition is applied on the first adherend and cooled, it is again melted by heating and another adherend is then pressed onto the first adherend, followed by cooling for solidification. When the composition of the present invention is employed as a coating agent, it is melted by heating and applied on the surface of a material to be coated usually in an amount of 3 to 15 g./m.$^2$ Alternatively, a material to be coated is passed through the molten composition, followed by cooling for solidification.

The application of the stabilized rosin ester prepared according to the present invention is not limited to the above-mentioned pressure-sensitive adhesive composition and hot-melt composition, and the stabilized rosin ester is suitably applicable to uses for which a conventional rosin ester is usually employed. For instance, the stabilized rosin ester is incorporated into a variety of plastics to improve their adhesiveness, rigidity, processability and heat sealability. It is also employed for paints, printing inks, floor tile materials and paving materials for roads.

The present invention is more particularly described and explained by means of the following Examples.

EXAMPLE 1

(1) Disproportionation reaction

To 100 g. of gum rosin from China having an acid value of 170 and a softening point of 74° C. was added 0.03 g. of a 5% palladium charcoal as a catalyst. The mixtue was subjected to disproportionation by agitating at 280° C. for 4 hours in an atmosphere of nitrogen to give 95 g. of a disproportionated rosin having an acid value of 158, a softening point of 75° C., and a Gardner color of 10.

(2) Purification

The disproportionated rosin obtained in the above (1) was distilled under a pressure of 3 mmHg in an atmosphere of nitrogen. The results are shown in Table 2.

TABLE 2

|  | Distilling temp. (°C.) | Still pot temp. (°C.) | Acid value | Yield (%) |
|---|---|---|---|---|
| Initial fraction | <195 | <210 | 57.5 | 5.1 |
| Main fraction | 195 to 250 | 210 to 280 | 179 | 85.7 |
| Residue | >250 | >280 | 31 | 9.1 |

The main fraction having an acid value of 179, a softening point of 78° C. and a Gardner color of 3 was employed in the next step.

(3) Esterification

One hundred grams of the purified disproportionated rosin obtained in the above (2) was placed in a four-necked flask and heated up to 180° C. in an atmosphere of nitrogen. After the rosin was melted, agitation was started and 12.1 g. of glycerol was added to the rosin at 200° C. The mixture was heated up to 280° C. and subjected to esterification at 280° C. for 8 hours to give 103 g. of a rosin ester having an acid value of 7, a softening point of 97° C., a weight average molecular weight of 766 and a Gardner color of 5.

The weight average molecular weight of the rosin ester was determined by gel permeation chromatography where calibration was performed by employing styrene oligomers of known molecular weight. The equipment used was a high speed liquid chromatograph ("HLC-801 A" made by Toyo Soda Manufacturing Co., Ltd.)

EXAMPLE 2

One hundred grams of the purified disproportionated rosin obtained in Example 1, (2) was placed in a four-necked flask and heated up to 180° C. in an atmosphere of nitrogen. After the rosin was melted, agitation was started and 14 g. of pentaerythritol was added to the rosin at 220° C. The mixture was heated up to 285° C. and subjected to esterification at 285° C. for 12 hours to give 102 g. of a rosin ester having an acid value of 10, a softening point of 117° C., a weight average molecular weight of 939 and a Gardner color of 7.

EXAMPLE 3

Into 2 liters of benzene was dissolved 1,000 g. of the unpurified disproportionated rosin obtained in Example 1, (1). A three-fourths portion of the benzene employed was evaporated to give a thick solution of the disproportionated rosin in benzene. To the solution was added 800 ml. of n-hexane, so that colorless fine crystals were precipitated. The crystalls were filtered and dried to give 540 g. of a purified disproportionated rosin having an acid value of 181 and a melting point 170° C.

One hundred grams of the purified disproportionated rosin was placed in a four-necked flask and heated up to 180° C. in an atmosphere of nitrogen. After the rosin was melted, agitation was started and 9 g. of glycerol and 7 g. of diethylene glycol were added to the rosin at 200° C. The mixture was heated up to 280° C. and subjected to esterification at 280° C. for 10 hours to give 107 g. of a rosin ester having an acid value of 8, a softening point of 75° C., a weight average molecular weight of 730 and a Gardner color of 5.

EXAMPLE 4

One hundred grams of the purified disproportionated rosin obtained in Example 1, (2) was placed in a four-necked flask and heated up to 180° C. in an atmosphere of nitrogen. After the rosin was melted, agitation was started and 0.1 g. of calcium hydroxide and 12 g. of glycerol were added to the rosin at 200° C. The mixture was heated up to 270° C. and subjected to esterification at 270° C. for 7 hours to give 104 g. of a rosin ester having an acid value of 6, a softening point of 100° C. a weight average molecular weight of 776 and a Gardner color of 5.

Comparative Example 1

One hundred grams of the unpurified disproportionated rosin obtained in Example 1, (1) was placed in a fournecked flask and heated up to 180° C. in an atmosphere of nitrogen. After the rosin was melted, agitation was started and 12.1 g. of glycerol was added to the rosin at 200° C. The mixture was heated up to 280° C. and subjected to esterification at 280° C. for 8 hours to give 104 g. of a rosin ester having an acid value of 7, a softening point of 81° C., a weight average molecular weight of 895 and a Gardner color of 11.

Comparative Example 2

One hundred grams of the unpurified disproportionated rosin obtained in Example 1, (1) was placed in a four-necked flask and heated up to 180° C. in an atmosphere of nitrogen. After the rosin was melted, agitation was started and 14 g. of pentaerythritol was added to the rosin at 220° C. The mixture was heated up to 285° C. and subjected to esterification at 285° C. for 12 hours to give 104 g. of a rosin ester having an acid value of 11, a softening point of 100° C., a weight average molecular weight of 1,080 and a Gardner color of 12.

Comparative Example 3

The same gum rosin as employed in Example 1, (1) was distilled in the same manner as described in Example 1, (2) to give a main fraction distilled at 195° to 250° C./3 mmHg. One hundred grams of the purified rosin having an acid value of 176, a softening point of 78° C. and a Gardner color of 5 was subjected to esterification in the same manner as described in Example 1, (3) to give 103 g. of a rosin ester having an acid value of 5, a softening point of 95° C., a weight average molecular weight of 775 and a Gardner color of 7.

Comparative Example 4

One hundred grams of the unpurified disproportionated rosin obtained in Example 1, (1) was placed in a four-necked flask and heated up to 180° C. in an atmosphere of nitrogen. After the rosin was melted, agitation was started and 7.9 g. of glycerol and 6.1 g. of diethylene glycol were added to the rosin at 200° C. The mixture was heated up to 280° C. and subjected to esterification at 280° C. for 10 hours to give 104 g. of a rosin ester having an acid value of 7, a softening point of 66° C., a weight average molecular weight of 750 and a Gardner color of 11.

The rosin esters obtained in Examples 1 to 3 and Comparative Examples to 3 were subjected to the following tests. For the purpose of comparison, a commercially available completely hydrogenated rosin ester having an acid value of 8, a softening point of 82° C. and a Gardner color of 5 (available under the commercial name "Foral 85" made by Hercules Inc.) was also subjected to the same tests.

Test for discoloring on heating

In a glass test tube having an inner diameter of 15 mm. was put 7 g. of the rosin ester. The test tube was allowed to stand in an air-circulating oven at 200° C. without sealing. The change in the color of the rosin ester was observed at regular intervals.

Test for oxidation resistance

Into a 50 ml. beaker was accurately measured 5 g. of the rosin ester having a particle size of 24 to 42 meshes. The beaker was placed in a pressure vessel and allowed to stand under an oxygen pressure of 21 kg./cm.$^2$ at 20° C. for a week. The amount of oxygen taken up in the rosin ester (weight gained) was measured.

TABLE 3

| Rosin ester | Gardner color | | | | Amount of oxygen taken up (% by weight) |
|---|---|---|---|---|---|
| | 0 hr. | 4 hr. | 24 hr. | 48 hr. | |
| Ex. 1 | 5 | 7 | 10 | 11 | 0.07 |
| Ex. 2 | 7 | 9 | 11 | 12 | 0.08 |
| Ex. 3 | 5 | 7 | 10 | 12 | 0.05 |
| Com. Ex. 1 | 11 | 14 | 16 | 17 | 0.08 |
| Com. Ex. 2 | 12 | 14 | 16 | 18 | 0.09 |
| Com. Ex. 3 | 7 | 13 | 17 | 18 | 3.05 |
| Completely hydrogenated rosin ester | 5 | 9 | 14 | 15 | 0.07 |

Table 3 reveals the following facts: (1) With the rosin esters prepared according to the present invention (Examples 1 to 3), the colors after heating for 48 hours are approximately the same as the initial colors of the rosin esters of Comparative Examples 1 to 2 prepared without purification step. (2) The rosin esters of Comparative Examples 1 to 3 are markedly discolored on heating for 24 hours. Particularly, although the rosin ester of comparative Example 3 prepared without disproportionation step is light-colored initially, its discoloration after heating for only 4 hours is more than that of the rosin esters prepared according to the present invention after heating for 48 hours. (3) It is generally esteemed in the art that the completely hydrogenated rosin ester is the most stabilized rosin ester and cherished in spite of its expensiveness. However, the rosin esters prepared according to the present invention are superior to the completely hydrogenated rosin ester in discoloration on heating. (4) With the rosin ester of Comparative Example 3, the amount of oxygen taken up is higher.

Examples 5 to 7 and Comparative Examples 5 to 7

A natural rubber (pale crepe No. 1) was masticated to give a rubber having a Mooney viscosity of 52 ML1+4(100° C.) The masticated rubber was blended with each of the rosin esters obtained in Examples 1 to 3 and Comparative Examples 1 to 3 so that the weight ratio of the rubber to the rosin ester was 55:45, giving 6 kinds of pressure-sensitive adhesive compositions.

Each composition was dissolved in a mixed solvent of n-heptane and toluene to give 6 kinds of solutions having a solid concentration of 20% by weight. Each solution was applied on a polyester film by means of an applicator and dried under a pressure of 50 mmHg at 50° C. for an hour to give 6 kinds of pressure-sensitive adhesive films having an adhesive layer of 30μ in thickness.

After allowed to stand in an atmosphere of 20° C. and 65% RH for 24 hours, the adhesive films were subjected to the following tests:

Test for tackiness (according to rolling ball method)

Employing PSTC-6 tackiness tester, a steel ball of 15 mm. in diameter was positioned on an inclined board at 10 cm. from the lower end of the board whose inclination angle was set at 21.5°. The steel ball was allowed to roll along the board then onto an adhesive film placed horizontally to extend the lower end of the inclined board. The rolling distance (cm.) of the steel ball on the adhesive layer was measured. A smaller rolling distance shows a higher tackiness.

Test for cohesive strength (creep test)

The adhesive film and a stainless steel plate cleaned by polishing with an abrasive paper were lapped in an area of 25 mm.×25 mm. and sticked together by pressing two times with a roller weighing 1 kg. The test sample thus prepared was set in a creep tester made by Toyo Seiki Co., Ltd. and a load of 500 g. was put to the lower end of the sample at 40° C. The slippage (mm.) between the adhesive film and the stainless steel plate was measured after 30 minutes. A smaller slippage shows a higher cohesive strength.

Test for adhesive strength

The adhesive film of 25 mm. in width and a stainless steel plate cleaned by polishing with an abrasive paper were sticked together by pressing two times with a roller weighing 1 kg. The test sample thus prepared was allowed to stand in an atmosphere of 20° C. and 65% RH for 12 hours. The peel strength (g./25 mm.) of the test sample was measured at a peel angle of 180° at a peel speed of 300/minute on a Tensilon type universal tension testing machine made by Toyo Sokki Co., Ltd.

Aging test

After aged by allowing to stand in an air-circulating oven at 70° C. for 24 hours, the adhesive film was subjected to the same tests as in the above-mentioned test for tackiness and test for cohesive strength except that a load of 200 g. was employed in the test for cohesive strength.

The results of the tests are shown in Table 4.

TABLE 4

| Pressure-sensitive adhesive composition | Tackifier | Tackiness (cm.) | Cohesive strength (mm.) | Peel strength (g./25 mm.) | Aging test | |
|---|---|---|---|---|---|---|
| | | | | | Cohesive strength (mm.) | Tackiness (cm.) |
| Ex. 5 | Ex. 1 | 1.5 | 1.4 | 1,040 | 1.0 | 2.6 |
| Ex. 6 | Ex. 2 | 2.4 | 1.0 | 1,100 | 0.6 | 2.3 |
| Ex. 7 | Ex. 3 | 1.5 | 2.0 | 1,000 | 1.5 | 1.5 |
| Com. Ex. 5 | Com. Ex. 1 | 1.7 | 2.0 | 690 | 3.0 | 3.3 |
| Com. Ex. 6 | Com. Ex. 2 | 2.2 | 1.5 | 780 | 2.5 | 4.0 |
| Com. Ex. 7 | Com. Ex. 3 | 2.0 | 1.5 | 850 | 6.1 | 14.8 |

As is clear from Table 4, the pressure-sensitive adhesives of Examples 5 to 7 employing the rosin esters of Examples 1 to 3 prepared according to the present invention have higher peel strengths and also have much higher cohesive strengths and tackinesses after aging than the pressure-sensitive adhesives of Comparative Examples 5 to 7 employing the rosin esters of Comparative Examples 1 to 2 prepared without purification step or the rosin ester of Comparative Example 3 prepared without disproportionation step.

Examples 8 to 10 and Comparative Examples 8 to 10

Fourty parts by weight of each of the rosin esters obtained in Examples 1 to 3 and Comparative Examples 1 to 2 and 4, 40 parts by weight of a copolymer of ethylene and vinyl acetate containing 28% by weight of vinyl acetate and having a melt index of 150 g./10 minutes (available under the commercial name of "Evaflex 220" made by Mitsui Polychemical Co., Ltd.) and 20 parts by weight of a microcrystalline wax having a melting point of 83° C. were melted and mixed uniformly to give 6 kinds of hot-melt adhesive compositions.

The obtained hot-melt adhesive compositions were subjected to the following tests:

Test for adhesive strength

An aluminum foil of 45μ in thickness was placed on a hot plate with a controlled surface temperature of about 130° C. Each adhesive composition heated up to about 180° C. was poured onto the aluminum foil and spread with an applicator to give an adhesive layer having a thickness of 30μ. Another aluminum foil of 45μ in thickness was pressed onto the adhesive layer under a pressure of 1.5 kg./cm.² at 160° C. for one second by means of a heat sealer made by Toyo Tester Co., Ltd. The obtained sample was allowed to stand in an atmosphere of 20° C. and 65% RH for 24 hours and then cut to give test pieces having a dimension of 25 mm. × 75 mm. The peel strength of the test pieces (g./25 mm.) was measured in the same manner as mentioned previously.

Creep test

Two aluminum foils having a dimension of 25 mm. × 75 mm. and a thickness of 45μ were sticked together in an area of 25 mm. × 25 mm. at one end thereof by employing each adhesivve composition in the same manner as described above.

The test sample with a load of 200 g. attached at the lower end was placed on a creep tester (made by Toyo Seiki Co., Ltd.) equipped with a programmed temperature control. The temperature of the test sample was elevated at a rate of 2° C./minute to determine the temperature where the sample came to separation.

The results of the tests are shown in Table 5.

TABLE 5

| Hot-melt adhesive composition | Tackifier Ex. No. | Alcohol employed | Softening point (°C.) | Peel strength (g./25 mm.) | Creep (°C.) |
|---|---|---|---|---|---|
| Ex. 8 | Ex. 1 | Glycerol | 97 | 1.780 | 53 |
| Com. Ex. 8 | Com. Ex. 1 | Glycerol | 81 | 1,520 | 47 |
| Ex. 9 | Ex. 2 | Pentaerithritol | 117 | 1,810 | 55 |
| Com. Ex. 9 | Com. Ex. 2 | Pentaerithritol | 100 | 1,590 | 48 |
| Ex. 10 | Ex. 3 | Glycerol Diethylene glycol | 75 | 1,650 | 44 |
| Com. Ex. 10 | Com. Ex. 4 | Glycerol Diethylene glycol | 66 | 1,300 | 38 |

Examples 11 to 13 and Comparative Examples 11 to 13

Fifty parts by weight of each of the rosin esters obtained in Examples 1 to 3 and Comparative Examples 1 to 2 and 4, 40 parts by weight of Evaflex 220 and 10 parts by weight of the same microcrystalline wax as employed in Examples 8 to 10 were melted and mixed uniformly to give 6 kinds of hot-melt adhesive compositions. With respect to each adhesive composition, the melt viscosity immediately after the preparation and the melt viscosity after 24 hours from the preparation were measured at 180° C. by a viscometer (Epprecht-Rheomat 15 made by Contraves A.G.). The results thereof are shown in Table 6.

TABLE 6

| Hot-melt adhesive composition | Tackifier Ex. No. | Alcohol employed | Softening point (°C.) | Melt viscosity at 180° C. (cP.) Immediately after | After 24 hours |
|---|---|---|---|---|---|
| Ex. 11 | Ex. 1 | Glycerol | 97 | 2,160 | 2,210 |
| Com. Ex. 11 | Com. Ex. 1 | Glycerol | 81 | 2,160 | 2,350 |
| Ex. 12 | Ex. 2 | Pentaerithritol | 117 | 2,480 | 2,530 |
| Com. Ex. 12 | Com. Ex. 2 | Pentaerithritol | 100 | 2,480 | 2,750 |
| Ex. 13 | Ex. 3 | Glycerol Diethylene glycol | 75 | 1,760 | 1,760 |
| Com. Ex. 13 | Com. Ex. 4 | Glycerol Diethylene glycol | 66 | 1,800 | 1,800 |

As is clear from Table 6, the melt viscosities of the hot-melt adhesive compositions of Examples 11 to 13 employing respectively the rosin esters of Examples 1 to 3 prepared according to the present invention are, respectively, approximately the same as those of the hot-melt adhesive compositions of Comparative Examples 11 to 13 employing respectively the rosin esters of Comparative Examples 1 to 2 and 4 prepared without purification step, although the softening points of the rosin esters of Examples 1 to 3 are higher than those of the rosin esters of Comparative Examples 1 to 2 and 4, respectively, when the rosin esters prepared employing the same alcohol are compared with each other. Furthermore, the melt viscosity of the hot-melt adhesive compositions of Examples 11 to 13 scarcely shows an increase with the passage of time.

What is claimed is:

1. A pressure-sensitive adhesive composition comprising an elastomer and a stabilized rosin ester having a higher softening point, the rosin ester being prepared by subjecting a rosin to disproportionation and purification, and esterifying, the resulting purified disproportionated rosin with a tri- or more valent polyhydric alcohol.

2. The composition of claim 1, in which the tri- or more valent polyhydric alcohol is employed in combination with a glycol.

3. The composition of claim 1, in which the stabilized rosin ester is employed in an amount of 20 to 150 parts by weight per 100 parts by weight of the elastomer.

4. The composition of claim 1, in which the elastomer is at least one member selected from the group consisting of natural rubber, random copolymer of styrene and butadiene, block copolymer of styrene and butadiene, block copolymer having a block structure of polystyrenepolyisoprene-polystyrene, block copolymer having a block structure of polystyrene-polyethylene-polybutylenepolystyrene, nitrile rubber, chloroprene rubber, polybutadiene, isoprene-isobutylene rubber, polyvinyl ether, homopolymer of acrylates, copolymer of acrylates and copolymer of acrylates and other monomers.

5. A hot-melt composition comprising at least one of an ethylenic copolymer and a wax, and a stabilized rosin ester having a higher softening point, the rosin ester being prepared by subjecting a rosin to disproportionation and purification, and esterifying the resulting purified disproportionated rosin with a tri- or more valent polyhydric alcohol.

6. The composition of claim 5, in which the tri- or more valent polyhydric alcohol is employed in combination with a glycol.

7. The composition of claim 5, in which the wax is employed in an amount of 10 to 300 parts by weight per 100 parts by weight of the ethylenic copolymer.

8. The composition of claim 5, in which the stabilized rosin ester is employed in an amount of 10 to 150 parts by weight per 100 parts by weight of at least one of the ethylenic copolymer and the wax.

9. The composition of claim 5, in which the ethylenic copolymer is at least one member selected from the group consisting of copolymer of ethylene and vinyl acetate, copolymer of ethylene and methyl acrylate, and copolymer of ethylene and ethyl acrylate.

10. A composition as in claim 7, wherein said wax is employed in an amount of 20 to 150 parts by weight per 100 parts by weight of the ethylenic copolymer.

* * * * *